(12) United States Patent
Scott et al.

(10) Patent No.: US 9,648,976 B2
(45) Date of Patent: May 16, 2017

(54) COMMUTER JAVA PRESS

(71) Applicant: GSI Outdoors, Inc., Spokane, WA (US)

(72) Inventors: Ian Scott, Spokane Valley, WA (US); Dave Burgett, Newman Lake, WA (US); Marc Tappeiner, Santa Barbara, CA (US); Frank Bleck, Santa Barbara, CA (US)

(73) Assignee: GSI Outdoors, Inc., Spokane, WA (US)

( * ) Notice: Subject to any disclaimer, the term of this patent is extended or adjusted under 35 U.S.C. 154(b) by 273 days.

(21) Appl. No.: 14/657,887

(22) Filed: Mar. 13, 2015

(65) Prior Publication Data

US 2016/0262564 A1 Sep. 15, 2016

Related U.S. Application Data

(60) Provisional application No. 61/953,778, filed on Mar. 15, 2014.

(51) Int. Cl.
*A47J 31/02* (2006.01)
*A47J 31/00* (2006.01)
*A47G 19/16* (2006.01)
*A47J 31/06* (2006.01)
*A47J 31/20* (2006.01)

(52) U.S. Cl.
CPC .......... *A47J 31/005* (2013.01); *A47G 19/16* (2013.01); *A47J 31/02* (2013.01); *A47J 31/06* (2013.01); *A47J 31/20* (2013.01)

(58) Field of Classification Search
CPC .......... A47J 31/005; A47J 31/02; A47J 31/20; A47G 19/16
See application file for complete search history.

(56) References Cited

U.S. PATENT DOCUMENTS

| | | | | |
|---|---|---|---|---|
| 881,562 A | * | 3/1908 | Ellis ...................... | A47J 31/20 99/319 |
| 1,440,047 A | * | 12/1922 | Aborn .................... | A47J 31/06 99/304 |
| 2,900,896 A | * | 8/1959 | Bondanini ............. | A47G 19/14 210/359 |
| 3,657,993 A | * | 4/1972 | Close ..................... | A47J 31/20 99/297 |
| 4,104,957 A | * | 8/1978 | Freedman ............. | A47J 31/106 219/689 |
| 5,635,233 A | * | 6/1997 | Levinson .................. | A23F 3/18 426/433 |
| 5,780,087 A | * | 7/1998 | Brady .................. | A23C 9/1524 366/256 |
| 5,887,510 A | * | 3/1999 | Porter .................... | A47J 31/20 99/287 |

(Continued)

*Primary Examiner* — Sean Michalski
(74) *Attorney, Agent, or Firm* — Randall Danskin P.S.

(57) ABSTRACT

A commuter java press provides a thermally insulated first cylindrical vessel having and open top and a closed bottom and a second cylindrical vessel axially carried in fluid tight engagement within a volume defined by the first cylindrical vessel, the second cylindrical vessel having an open top and a fluid permeable filter at a bottom portion. A cap threadably engages with the top portion of the second cylindrical vessel and a flip top is user operable to optionally close and open a drinking orifice defined in the cap.

6 Claims, 6 Drawing Sheets

(56) References Cited

U.S. PATENT DOCUMENTS

| | | | |
|---|---|---|---|
| 6,152,018 A * | 11/2000 | Yeh | A47J 36/34 220/632 |
| 6,186,052 B1 * | 2/2001 | Huang | A47G 19/14 99/287 |
| 6,240,833 B1 * | 6/2001 | Sham | A47J 31/20 99/283 |
| 6,561,080 B1 * | 5/2003 | Feeney | A47J 31/24 99/295 |
| D494,470 S | 8/2004 | Guyot | |
| 6,797,304 B2 * | 9/2004 | McGonagle | A47J 31/20 426/431 |
| 6,817,750 B1 * | 11/2004 | Sands | A47J 19/027 366/205 |
| D509,135 S | 9/2005 | Guyot | |
| 7,318,374 B2 * | 1/2008 | Guerrero | A47J 31/0626 99/321 |
| D570,647 S * | 6/2008 | Bodum | A47J 31/0626 D7/312 |
| D624,786 S * | 10/2010 | Frank | A47J 31/0626 D7/399 |
| 8,182,683 B1 | 5/2012 | Allen | |
| 8,234,971 B2 | 8/2012 | Cerroni | |
| 9,179,798 B2 * | 11/2015 | Albanese | A47J 31/20 |
| 2003/0209511 A1 | 11/2003 | Guyot | |
| 2003/0209512 A1 | 11/2003 | Guyot | |
| 2007/0007296 A1 | 1/2007 | Guyot | |
| 2007/0256569 A1 * | 11/2007 | Lee | A47G 19/16 99/275 |
| 2009/0184042 A1 | 7/2009 | Steed et al. | |
| 2010/0116143 A1 | 5/2010 | Cerroni | |
| 2012/0024162 A1 * | 2/2012 | Chen | A47J 31/005 99/316 |
| 2012/0225175 A1 * | 9/2012 | Lown | A47J 31/06 426/435 |
| 2013/0284030 A1 * | 10/2013 | Katz | A47J 31/38 99/297 |
| 2014/0044837 A1 * | 2/2014 | Weisman | A47G 19/16 426/79 |
| 2014/0116259 A1 * | 5/2014 | Landford | A47G 19/16 99/323 |
| 2014/0251153 A1 * | 9/2014 | Tien | A47J 31/0636 99/322 |
| 2015/0157049 A1 * | 6/2015 | Fogelin | A23L 2/72 426/495 |
| 2015/0272378 A1 * | 10/2015 | Sands | A47J 31/42 426/433 |
| 2017/0000289 A1 * | 1/2017 | Feber | A47J 31/446 |

* cited by examiner

COMMUTER JAVA PRESS

IIA. RELATED APPLICATIONS

This Utility Patent Application claims the benefit and priority of earlier filed U.S. Provisional Patent Application No. 61/953,778 filed on Mar. 15, 2014 and titled COMMUTER JAVA PRESS. The inventorship of the instant Utility Patent Application and the earlier filed U.S. 61/953,778 is the same. The entire contents of earlier filed U.S. 61/953,778 is incorporated herein, in its entirety, by this reference.

II. BACKGROUND OF INVENTION

IIB. Field of Invention

This invention relates to containers, and more particularly to coffee press type containers having inner and outer axially slidably engageable portions and a user controlled top covering a drinking orifice for steeping and infusing flavors into heated liquids.

IIC. Background and Description of Prior Art

A French press or coffee press is a preferred method of brewing coffee among professional coffee tasters and the coffee drinking public. Known coffee presses are relatively simple mechanical devices comprising a container having an open top portion and a closed bottom portion and defining an interior volume. A removable lid securely engages with the open top portion of the container and generally defines an axially aligned hole through which an axially movable rod extends. One end portion of the rod is movably carried within the interior volume of the container, and that rod end portion typically carries a disc shaped fluid permeable mesh screen filter having a diameter that extends diametrically across the volume of the container. Circumferential edges of the screen filter slidably engage the inner circumferential walls of the interior volume. A handle is carried at an opposing end portion of the rod, exterior of the volume. In use, ground coffee or tea is placed in the interior volume and heated water is added thereto. The removable lid is placed on the open top of the container with the rod withdrawn so that the screen filter is vertically above the heated fluid allowing the coffee/tea to steep for a period of time. After the coffee/tea has steeped, the user grasps the handle on the rod, and forces the rod axially downwardly through the hole defined in the removable lid. Responsively, the screen filter is forced downwardly through the interior volume and simultaneously, flavor infused fluid passes through the screen filter while the coffee grounds and other particulates are forced downwardly below the screen filter effectively separating the coffee grounds/tea leaves and particulates from the liquid.

Although various types and configuration of coffee presses are available, most coffee presses are of a type that is used in a home, or restaurant or other fixed location. Coffee presses that are mobile, or available to use by commuters and people traveling are less common, and due to the physical structure and configuration of known coffee presses, are not overly useful, safe or practical because known coffee presses are subject to leakage, and have multiple parts that are only loosely fitted together.

What is needed is a coffee press that provides the enhanced taste of French press coffee while simultaneously being easily usable by commuters and travelers, and further a coffee press that is not subject to spillage when tipped over or otherwise displaced from a standard upright orientation.

Our invention aims to resolve these and other disadvantages inherent in known coffee presses by providing a commuter coffee press that is easily transportable, does not leak, easily seals, provides enhanced taste and flavor, and will not leak even when tipped over or otherwise placed in a position other than an upright orientation.

Our invention does not reside in any of the foregoing features individually but rather in the synergistic combination of all of its structures, which necessarily give rise to the functions flowing therefrom as herein specified and claimed.

III. SUMMARY

A commuter java press provides a thermally insulated first cylindrical vessel having an open top and a closed bottom and a second cylindrical vessel axially carried in fluid tight engagement within a volume defined by the first cylindrical vessel, the second cylindrical vessel having an open top and a fluid permeable filter at a bottom portion. A removable lid threadably engages with the top portion of the second cylindrical vessel and a flip top is user operable to optionally close and open a drinking orifice defined in the lid.

In providing such an apparatus it is:

a principal object to provide a commuter java press that allows a user to make a single cup of coffee.

a further object to provide a commuter java that it is easily transportable.

a further object to provide a commuter java that is thermally insulated.

a further object to provide a commuter java having a user operated opening and closing drinking orifice.

a further object to provide a commuter java that will not spill when tipped over.

a further object to provide a commuter java having a flexibly resilient fluid tight seal between the first cylindrical vessel and the second cylindrical vessel.

a further object to provide a commuter java having two spaced apart flexibly resilient fluid tight seals between the first cylindrical vessel and the second cylindrical vessel.

a further object to provide a commuter java press having a user operable drinking orifice closure that opens and closes simultaneously a drinking orifice defined in the removable lid and a vent defined in the removable lid.

a further object to provide a commuter java press having a covering over a vent opening in the removable lid.

a further object to provide a commuter java press having a circumferentially extending lip on the outer circumferential surface of a second cylindrical vessel proximate the removable lid, to engage with a circumferentially extending seal carried at the top open end portion of the first cylindrical vessel to create a fluid tight seal between the first cylindrical vessel and the second cylindrical vessel and to positionally maintain the second cylindrical vessel within the volume defined by the first cylindrical vessel.

a still further object to provide such apparatus that is of new and novel design, of a rugged and durable nature, of simple and economic manufacture and use and one that is otherwise well suited to the uses and purposes for which it is intended.

Other and further objects of our invention will appear from the following specification and accompanying drawings which form a part hereof. In carrying out the objects of our invention it is to be understood that its features are susceptible to change in design and structural arrangement with only one preferred and practical embodiment of the best known mode being illustrated in the accompanying drawings and specified, as is required.

IV. BRIEF DESCRIPTIONS OF DRAWINGS

In the accompanying drawings which form a part hereof and wherein like numbers and references refer to similar parts throughout:

V. DESCRIPTION OF PREFERRED EMBODIMENT

As used herein, the term "top", its derivatives, and grammatical equivalents refers to that portion of our commuter java press 9 that is vertically distal from a supporting surface upon which our java press 9 may be placed while in an upright orientation. The term "bottom", its derivatives, and grammatical equivalents refers to that portion of our commuter java press 9 that is vertically proximate to the supporting surface.

Figure 1:
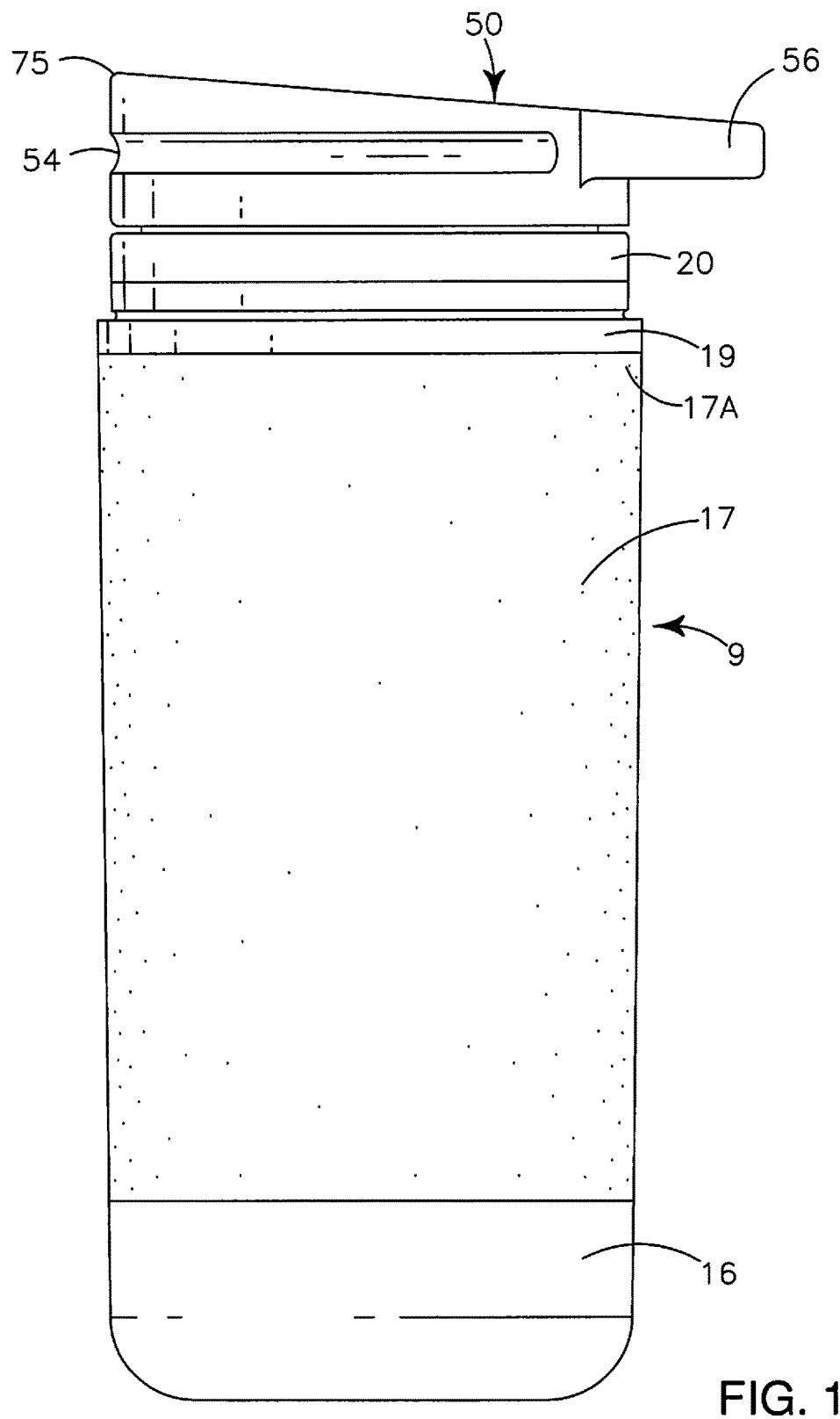
FIG. 1 is an orthographic side view of our commuter java press in an assembled configuration.
Figure 2:
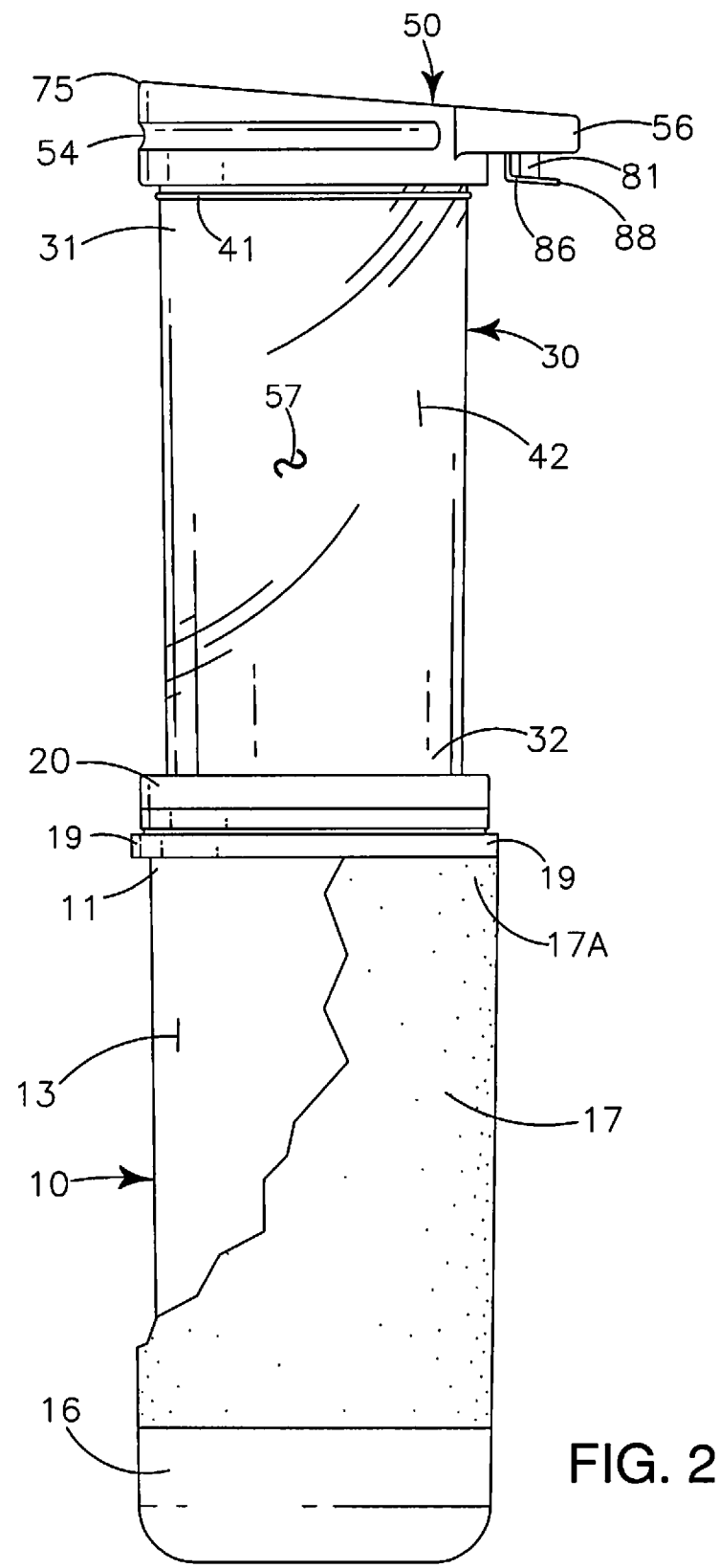
FIG. 2 is an orthographic side view, similar to that of FIG. 1 showing the second cylindrical vessel partially axially withdrawn from the first cylindrical vessel.

Referring to the Figures and more particularly to FIG. 2, our commuter java press 9 generally provides a first outer cylindrical vessel 10, a second inner cylindrical vessel 30 that axially nests within the first cylindrical vessel 10 and a lid 50. The first cylindrical vessel 10 and the second cylindrical vessel 30 are preferably formed of polypropylene, although any other food safe high temperature resistant material may likewise be used to form the cylindrical vessels 10, 30, such as, but not limited to, stainless steel. It is preferable the material be break resistant and not subject to significant thermal expansion/contraction.

The first cylindrical vessel 10 defines an open top portion 11, has a closed bottom portion 12, an outer circumferential surface 13, an inner circumferential surface 14 and defines an interior volume 15. An insulating bottom cap 16 is carried on the outer circumferential surface 13 of the closed bottom portion 12 and is formed of a material that is fluid impermeable, slip resistant and thermally insulative, such as, but not limited to polyurethane.

A circumferential edge 18 extending about the open top portion 11 defines an orifice (not shown) communicating with the interior volume 15. A flexibly resilient fluid tight seal 20 is carried on the circumferential edge 18 and extends radially inwardly from the circumferential edge 18 to slidably frictionally engage with an outer circumferential surface 42 of the second inner cylinder 30 and provide a fluid tight seal therebetween.

A circumferential ridge 19 extends radially outwardly from the outer circumferential surface 13 spacedly below the circumferential edge 18 and provides a "ledge" which frictional engages with an upper end edge portion 17A of an insulating sleeve 17 to prevent the insulating sleeve 17 from moving axially upwardly on the outer circumferential surface 13 of the first cylindrical vessel 10.

The insulating sleeve 17 extends about the outer circumferential surface 13 and provides thermal insulation, and an aesthetically appealing exterior decoration that may be customized as desired, such as with a logo or artwork. The insulating sleeve 17 further insulates the user's hand from high temperatures that may result from carrying heated fluid within the interior volume 15 to provide additional safety for the user.

The second cylindrical vessel 30 in generally tubular in configuration and has a diameter 45 that allows the second cylindrical vessel 30 to be axially slidably carried within the volume 15 defined by the first cylindrical vessel 10. The second cylindrical vessel 30 has an open top portion 31 defining a top orifice 31A, an open bottom portion 32 defining a bottom orifice 32A, an outer circumferential surface 42, an inner circumferential surface 43 and defines an interior volume 44 between the open top portion 31 and the open bottom portion 32.

A screen filter 37 is carried at the open bottom portion 32 of the second cylindrical vessel 30 and extends across the diameter 45 covering the bottom orifice 32A so that fluids may permeate through the filter 37, but solids and particulates, such as but not limited to, coffee grounds and tea leaves may not pass therethrough. Webs 38 are spacedly arrayed about the filter 37 to provide rigidity and the strength to the filter 37. The webs 38 may be permanently bonded to edge portions (not shown) of the bottom portion 32 defining the bottom orifice 32A of the second cylindrical vessel 30. In a second preferred embodiment, the webs 38 and filter 37 may be releasably secured to the bottom portion 32 of the second cylindrical vessel 30 covering the bottom orifice 32A, such as with mating threads, or snap fittings, or other known releasable interconnections known to those skilled in the art.

A circumferentially extending groove 33 is defined in the outer circumferential surface 42 spacedly adjacent the bottom portion 32. A flexibly resilient bottom seal 34 is carried within the groove 33 extending a circumferentially around the second cylindrical vessel 30 spacedly adjacent the bottom portion 32. The bottom seal 34 has a radially outwardly extending lip 35 thereon, that provides fluid tight engagement with the inner circumferential surface 14 of the first cylindrical vessel 10 when the second cylindrical vessel 30 is within the interior volume 15 defined by the first cylindrical vessel 10.

Threads 40 are defined in the second inner cylinder 30 proximate the top portion 31 and extend circumferentially thereabout providing a releasable fastening means for the lid 50.

A ridge 41 extending radially outwardly from the outer circumferential surface 42 is carried spacedly below the threads 40 and extends circumferentially about the second cylindrical vessel 30 top portion 31. The ridge 41 releasably engages with the seal 20 of the first cylindrical vessel 10 and provides a fluid tight seal therebetween.

Figure 3:
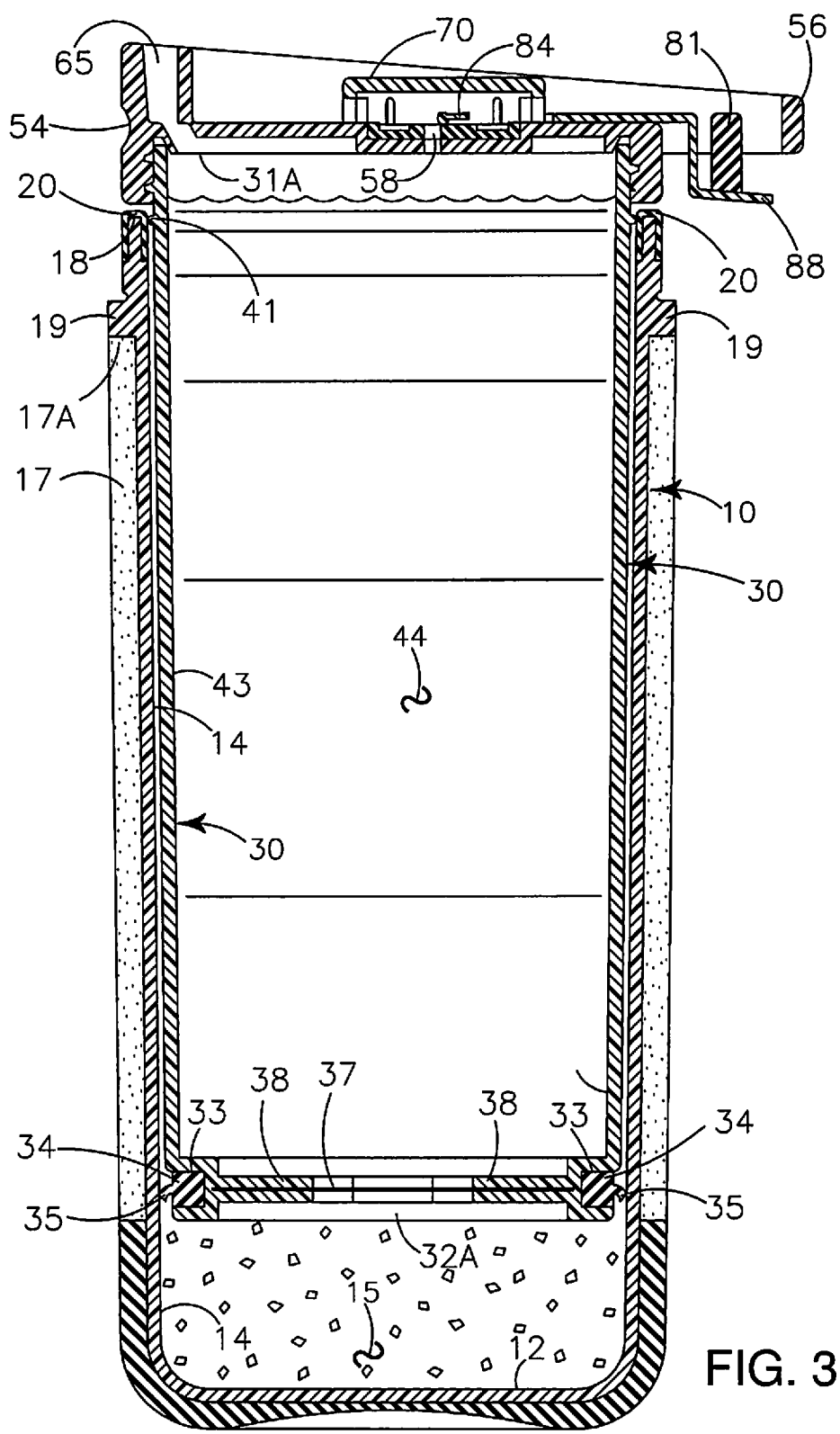
FIG. 3 is an orthographic vertical cross-section view of the commuter java press of FIG. 1.

As shown in FIG. 3, when the second cylindrical vessel 30 is fully inserted into the volume 15 defined by the first cylindrical vessel 10 the outer circumferential surface 42 of the second cylindrical vessel 30 is in close proximity with the inner circumferential surface 14 of the first cylindrical vessel 10. The bottom seal 34, and more particularly the radially extending lip 35 of the bottom seal 34 is in direct frictional engagement with the inner circumferential surface 14 of the first cylindrical vessel 10. In addition, the radially extending ridge 41 of the second cylindrical vessel 30 is frictionally engaged with the seal 20 extending circumferentially about the open top portion 11 of the first cylindrical vessel 10, providing a second fluid tight seal between the second cylindrical vessel 30 and the first cylindrical vessel 10. As further shown in FIG. 3, particulates, such as coffee grounds and tea leaves are forced into, and maintained within the interior volume 15 defined by the first cylindrical vessel 10 spacedly below the filter 37 of the second cylindrical vessel 30. Steeped fluid, such as infused water, passes through the filter 37 and into the interior volume 44 defined by the second cylindrical vessel 30, where the steeped water may be consumed by the user through drinking orifice 65.

As shown in FIGS. 4, 5, 6, 7 and 87, the lid 50 is generally disk shaped in configuration having a top portion 51, a bottom portion 52, a circumferential edge 53 and upwardly extending perimeter wall 55, a gripping handle 56 and defining a drinking orifice 65.

Figure 4:
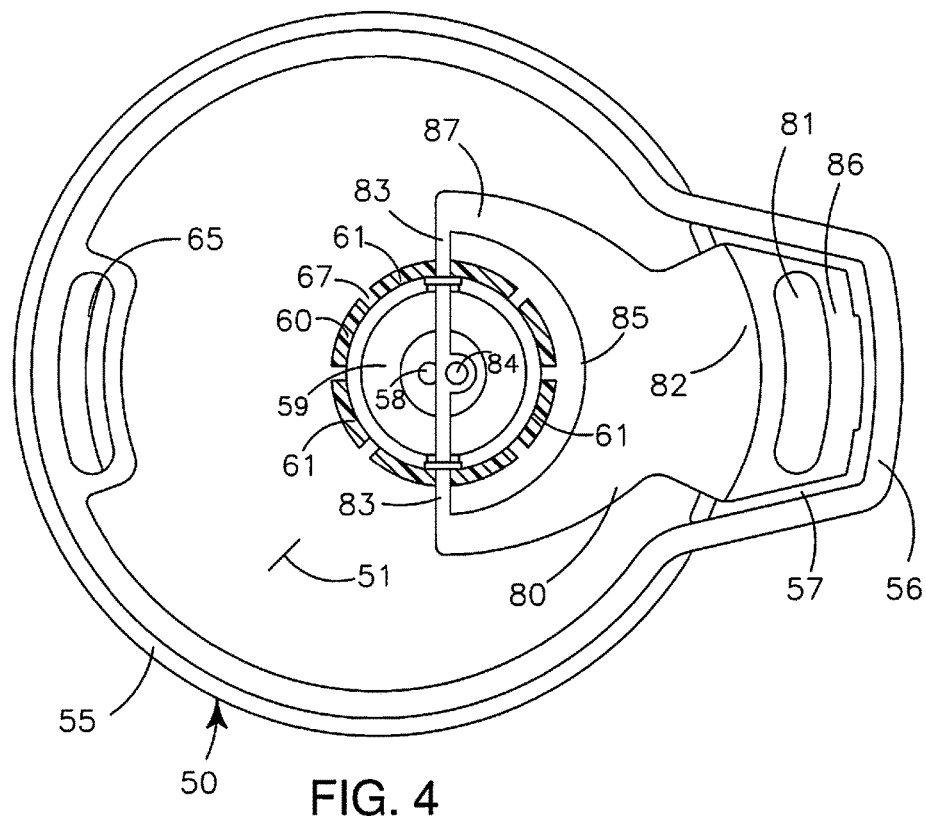
FIG. 4 is an orthographic top, downward looking view of the lid with the flip closure pivoted to an open position and the closure cap removed from the closure base showing the vent.
Figure 5:
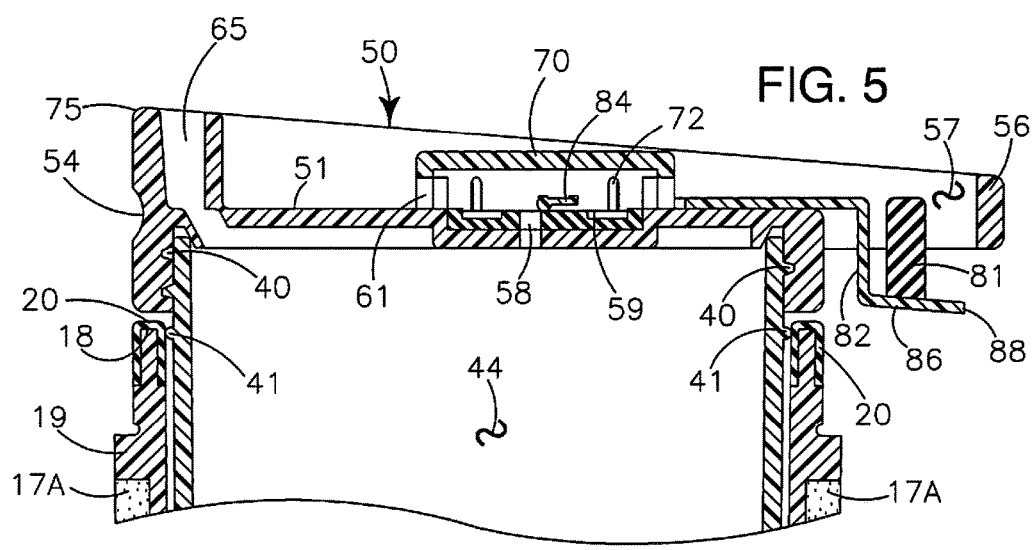
FIG. 5 is an enlarged partial cut-away orthographic vertical cross-section view of the lid of FIG. 4.

Threads 66 are defined in a bottom inner surface of the circumferential edge 54 for releasable engagement with the threads 40 defined in the top portion 31 of the second cylindrical vessel 30. The gripping handle 56 is generally diametrically opposite the drinking orifice 65. The gripping handle 56 extends generally radially outwardly from the circumferential edge 53 and provides a means for a user to securely grip the lid 50 in order to axially rotate the lid 50 relative to the cylindrical vessels 10, 30 in order to tighten or loosen the lid 50. The gripping handle 56 is peripheral in construction defining a space 57 between the gripping handle 56 and the circumferential edge 53. The space 57 provides a location for attaching a lanyard and the like, and also provides protection to flip closure 80 when the flip closure 80 is in an open position. (FIGS. 4, 5).

A closure base 60 is carried on the top portion 51 of the lid 50 at a generally medial position and is generally circular in configuration. The closure base 60 has plural upwardly extending protuberances 61 spaced from one another by diametrically spaced axle slots 62 and air slots 67. A vent 58 is defined in the lid 50 at approximately a center of the closure base 60. The vent 58 communicates between the top portion 51 and the bottom portion 52 of the lid 50 allowing air to flow therebetween to prevent a vacuum from forming within the volume 44, 15. A flexible seal 59 is carried within the closure base 60 extending diametrically between the protuberances 61. The seal 59 defines a hole (not shown) that is axially aligned with the vent 58 so that the vent 58 is not obstructed by the seal 59 and air may freely pass therethrough.

A closure cap 70 releasably engages over and about the closure base 60 to pivotally secure the flip closure 80 to the closure base 60 in the axle slots 62. The closure cap 70 has a generally planar top portion 76 and downwardly extending sidewalls 77. Axle slots 71 are defined in the sidewalls 77 at generally diametrically spaced positions and vent slots 72 align with the air slots 67 defined by the closure base 60 allowing air to flow therethrough, and thereafter into and out of the vent 58. Base pins (not shown) carried by the sidewalls 77 opposite the top portion 76 engage with closure base holes (not shown) defined in the lid 50 spacedly adjacent, outward of the protuberances 61. Engagement of the base pins (not shown) in the base holes (not shown) positionally secures the closure cap 70 to the closure base 60 and the lid 50.

Figure 6:
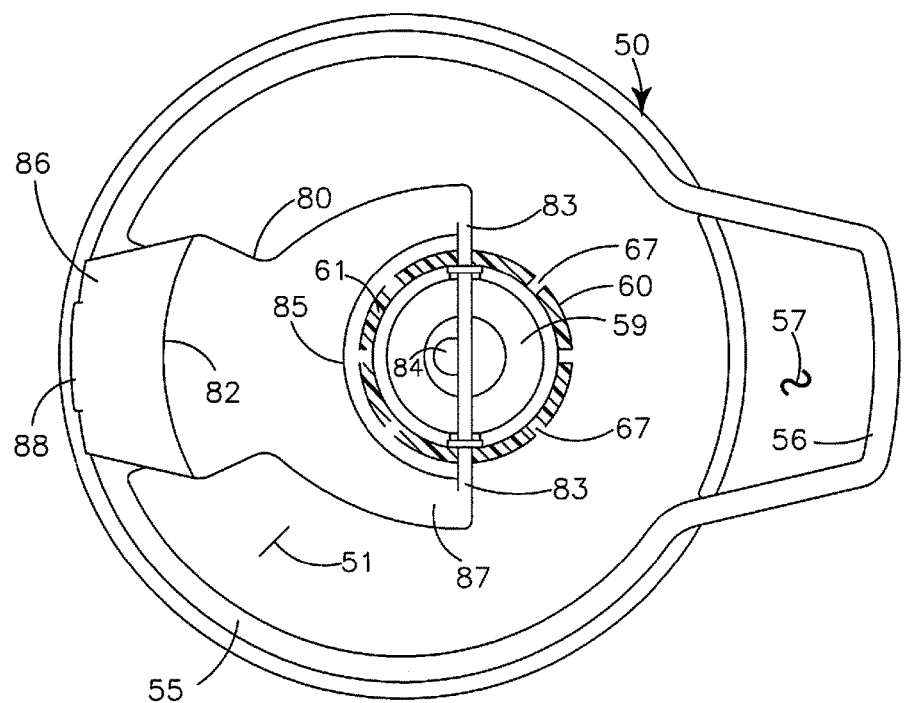
FIG. 6 is an orthographic top, downward looking view similar to that of FIG. 4 showing the flip closure pivoted to a closed position with the vent sealed.
Figure 7:
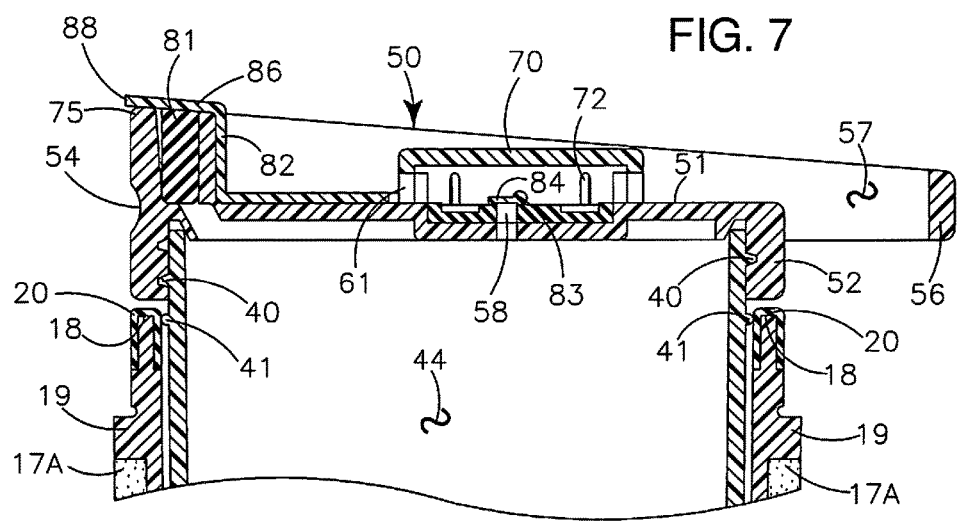
FIG. 7 is an enlarged partial cut-away orthographic vertical cross-section view of the lid of FIG. 6 with the closure cap installed.
Figure 8:
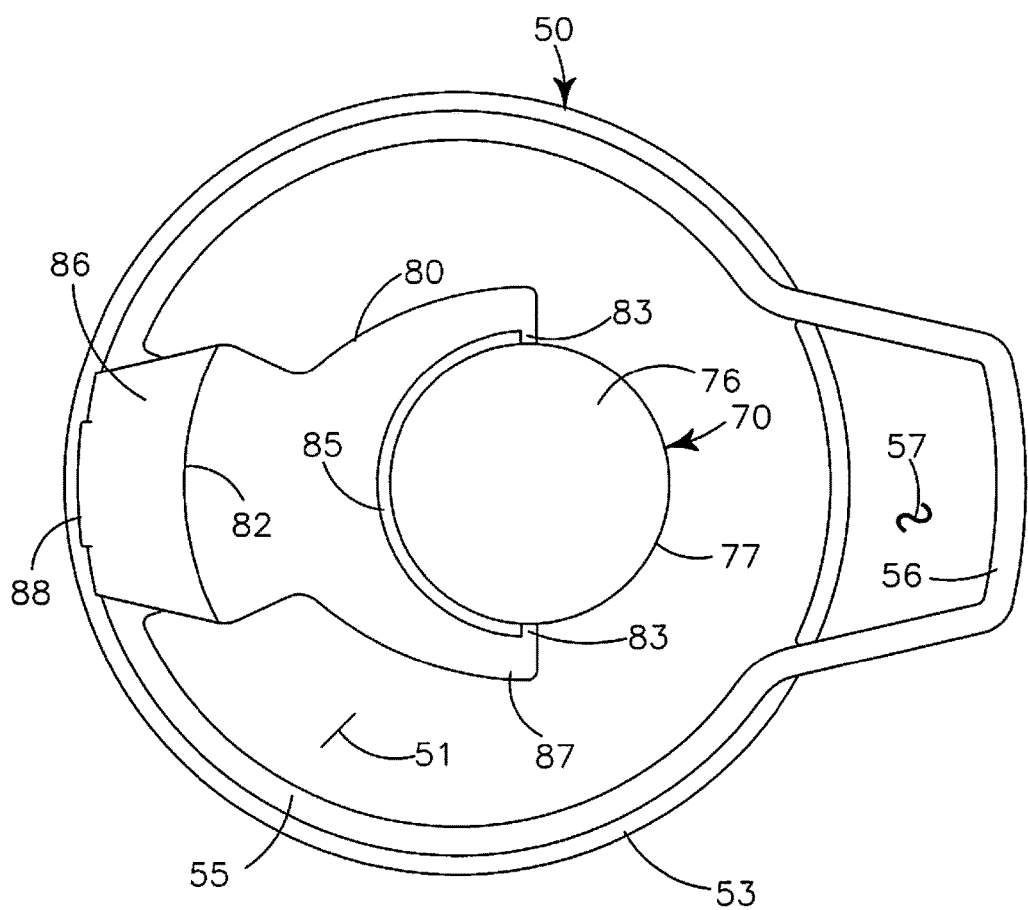
FIG. 8 is an orthographic top, downward looking view similar to that of FIG. 6 showing the closure cap installed on the closure base of the lid.

The flip closure 80 has a first end portion 86 and a second end portion 87. The first end portion 86 is vertically offset from the second end portion 87 by offset leg 82. (FIG. 5). A drinking orifice plug 81 is carried at the first end portion 86 and releasably engages in drinking orifice 65 when the flip closure 80 is in a closed position (FIGS. 6, 7). The drinking orifice plug 81 has a peripheral configuration similar to the drinking orifice 65 and when engaged therewith, provides a fluid tight seal therebetween so that fluid may not leak through the drinking orifice 65. A finger grip 88 is carried at the first end portion 86 to allow a user to easily grasp and to move the flip closure 80. A pivot axle 83 is carried at the second end portion 87 and the pivot axle 83 extends across an arcuate opening 85 defined in the second end portion 87 that accommodates the closure base 60 and closure cap 70. The pivot axle 83 is carried within the axle slots 62 defined by the closure base 60 and extends diametrically across the closure base 60. A vent block 84 is carried on the pivot axle 83 and responsively moves as the pivot axle 83 rotates. The vent block 84 is positioned on the pivot axle 83 so that when the flip closure 80 is pivoted to an open position (FIGS. 4, 5) the vent block 84 is not communicating with the seal 59, nor with the vent 58 allowing air to pass into and out of the interior volumes 44, 15. When the flip closure 80 is in a closed position (FIGS. 6, 7) the vent block 84 is in direct frictional contact with the seal 59 effectively sealing the vent 58 and preventing air from passing into and out of the interior volumes 44, 15. The prevention of air movement into and out of the interior volumes 44, 15 creates a vacuum within the interior volumes 44, 15 which enhances temperature retention and also minimizes any spillage. The closure cap 70, as shown in FIG. 6, extends over and about the closure base 60 while allowing the pivot axle 83 to extend through the axle slots 71 which permits the pivot axle 83, and the flip closure 80 to freely pivot between an open orientation (FIGS. 4, 5) and a closed orientation (FIGS. 6, 7).

The positioning of the vent 58 under the closure cap 70 and within the closure base 60 also prevent any splashing or ejection of fluids from the interior volumes 44, 15 through the vent 58 when the second cylindrical vessel 30 is rapidly forced downwardly into the volume 15 defined by the first cylindrical vessel 10 and also when the commuter java press 9 is dropped, shaken or otherwise subjected to shock or rapid movement. Any liquid, which may be hot, passing through the vent 58 will strike an underside portion (not shown) of the closure cap 70 and be deflected to leak or dribble out from the closure base 60 through the axle slots 71 or vent holes 72.

Having described the structure of our commuter java press 9, its operation may be understood.

In use, a user would have access to a quantity of heated water that has a temperature sufficient to satisfy the users desires. The user would grasp the commuter press 9 in his/her hands, and would use one hand to securely hold the first cylindrical vessel 10, with the insulating sleeve 17 extending thereabout, to prevent the first cylindrical vessel 10 from moving or rotating. The user would securely grasp of the lid 50 and exert simultaneous rotational and pulling forces upon the lid 50 that is threadably engaged with the second cylindrical vessel 30. The user may utilize the gripping handle 56 of the lid 50 to enhance their ability to simultaneously rotate and pull upon the lid 50 and the second cylindrical vessel 30 to withdraw a second cylindrical vessel 30 from the volume 15 defined by the first cylindrical vessel 10.

Once the second cylindrical vessel 30 is removed from/separated from the first cylindrical vessel 10 the user may add a desired quantity of coffee grounds or tea leaves and heated water into the volume 15 defined by the first cylindrical vessel 10. The water level should not extend over a fill line (not shown) marked on the inner circumferential surface 14 of the first cylindrical vessel 10. If the water level extends over the fill line (not shown), there is a risk that the heated water will overflow the commuter java press 9 when the second cylindrical vessel 30 is inserted into the first cylindrical vessel 10. After some period of time during which is the heated water is steeped, or otherwise infused with the flavoring, the user would grasp the second cylindrical vessel 30 about the lid 50 and manipulate the flip closure 80 to an open orientation. The user would then axially insert the second cylindrical vessel 30 into the volume 15 defined by the first cylindrical vessel 10. The user should not rapidly force the second cylindrical vessel 30 into the first cylindrical vessel 10, but rather only apply steady but slow axially downward pressure thereto. As the second cylindrical vessel 30 moves axially into the interior volume 15 defined by the first cylindrical vessel 10, the steeped fluid within the interior volume 15 passes upwardly through the filter 37 and into the interior volume 44 defined by the second cylindrical vessel 30. Seal 34 and lip 35 prevent the heated steeped fluid from passing into the space between the inner circumferential surface 14 of the first cylindrical vessel 10, and the outer circumferential surface 42 of the second cylindrical vessel 30. The filter 37 concentrates all the particulate matter at the interior bottom portion of the first cylindrical vessel 10 and prevents the particulate matter from entering the volume 44 defined by the second cylindrical vessel 30. After the second cylindrical vessel 30 is fully inserted into the first cylindrical vessel 10, the flip closure 80 may be pivoted to a closed position allowing the user to transport the freshly steeped infused fluid without risking spillage. By opening the flip closure 80, the user may consume the steeped/infused fluid.

The unique structure and configuration of the vent 58, the seal 59, the closure base 60 and the closure cap 70 also allows the second cylindrical vessel 30 to be axially inserted into the first cylindrical vessel 10 without first opening the flip closure 80. Air pressure created below the filter 37 and above the fluid level within the interior volume 15 defined by the first cylindrical vessel 10 as the second cylindrical vessel 30 is forced into the volume 15 defined by the first cylindrical vessel 10 is sufficient to force the vent bloc 84 away from the seal 59 allowing air to pass therebetween. The structure of the closure cap 70, and its vent holes 72 allow heated steeped/infused fluid that might also be forced through the vent 58 to pass outwardly, without "spraying" on to a user which might cause injury. The structure of the closure cap 70 further provides a safety feature if the fluid level with in the first cylindrical vessel 10 exceeds the fill line. Allowing the heated steeped/infused fluid to pass through the vent 58 also prevents the heated steeped/infused fluid from possibly being forced outwardly through this space between the inner circumferential surface 14 of the first cylindrical vessel 10 and the outer circumferential surface 42 of the second cylindrical vessel 30. If heated water were to pass outwardly through that "space" it is likely the heated water would spill onto the users hand which might cause injury or otherwise.

The foregoing description of our invention is necessarily of a detailed nature so that a specific embodiment of its best mode may be set forth as is required, but it is to be understood that various modifications of details, and rearrangement, substitution and multiplication of parts may be resorted to without departing from its spirit, essence or scope.

Having thusly described our invention, we file this Utility Patent Application and pray issuance of UTILITY LETTERS PATENT.

We claim:

1. An apparatus for preparing, containing and dispensing a comestible fluid, the apparatus comprising in combination:
    a first cylindrical vessel having an open top portion, a closed bottom portion and defining a fluid containing interior volume between the open top portion and the closed bottom portion, the interior volume having a diameter and an inner circumferential wall;
    a second cylindrical vessel having a diameter, an open top portion, an open bottom portion and defining an interior volume between the open top portion and the open bottom portion, the second cylindrical vessel axially movable within the interior volume defined by the first cylindrical vessel;
    a fluid permeable filter covering the open bottom of the second cylindrical vessel;
    a seal carried by the second cylindrical vessel spacedly adjacent the open bottom portion, the seal frictionally communicating with the inner circumferential wall of the first cylindrical vessel when the second cylindrical vessel is within the interior volume defined by the first cylindrical vessel; and
    a lid releasably attachable to the open top portion of the second cylindrical vessel, the lid having user movable flip closure that optionally simultaneously obstructs a drinking orifice defined in the lid and a vent defined in the lid to prevent fluid passage therethrough, and simultaneously unobstructs the drinking orifice and the vent responsive to user manipulation.

2. The apparatus of claim 1 further comprising:
    a seal extending circumferentially about the open top portion of the first cylindrical vessel, the seal frictionally engaging with an outer circumferential surface of the second cylindrical vessel when the second cylindrical vessel is within the interior volume defined by the first cylindrical vessel.

3. The apparatus of claim 2 further comprising:
    a radially outwardly extending circumferential ridge on an outer circumferential surface of the second cylindrical vessel spacedly below the open top portion to frictionally releasably engage with the circumferentially extending seal carried about the open top portion of the first cylindrical vessel.

4. The apparatus of claim 1 further comprising:
    threads defined in an outer circumferential surface of the second cylindrical vessel adjacent the open top portion to releasably engage with mating threads defined in an inner circumferential surface of the lid.

5. The apparatus of claim 1 further comprising:
    a closure cap base carried on the lid radially outwardly from the vent, the closure cap base having plural spaced apart protuberances with spaces between the plural protuberances forming axle slots and vent holes;
    a flip closure pivotally communicating with the closure cap base, the flip closure having a first end portion carrying a drinking orifice plug that obstructs the drinking orifice defined in the lid and a second end portion carrying a pivot axle having vent block that that simultaneously obstructs the vent hole when the flip closure is in a closed position; and a closure cap releasable engageable with the closure cap base, the closure cap pivotally securing the flip closure to the closure cap base and preventing axial ejection of the comestible fluid through the vent when the second cylindrical vessel is axially inserted into the interior volume defined by the first cylindrical vessel when fluid is within the interior volume defined by the first cylindrical vessel.

6. The apparatus of claim 1 wherein:

the vent defined in the lid allows the second cylindrical vessel to be axially inserted into the interior volume defined by the first cylindrical vessel while the drinking orifice defined by the lid is obstructed.

* * * * *